US007887653B2

(12) United States Patent
Goto et al.

(10) Patent No.: US 7,887,653 B2
(45) Date of Patent: Feb. 15, 2011

(54) DEVICE AND METHOD FOR MANUFACTURING BAG WITH CHUCK TAPE

(75) Inventors: Shuichi Goto, Bunkyo-ku (JP); Takehiro Iwamoto, Bunkyo-ku (JP); Kenichi Tanaka, Sodegaura (JP)

(73) Assignee: Idemitsu Unitech Co. Ltd., Tokyo (JP)

( * ) Notice: Subject to any disclaimer, the term of this patent is extended or adjusted under 35 U.S.C. 154(b) by 453 days.

(21) Appl. No.: 11/911,777

(22) PCT Filed: Apr. 17, 2006

(86) PCT No.: PCT/JP2006/308083

§ 371 (c)(1), (2), (4) Date: Oct. 17, 2007

(87) PCT Pub. No.: WO2006/112448

PCT Pub. Date: Oct. 26, 2006

(65) Prior Publication Data

US 2009/0050254 A1 Feb. 26, 2009

(30) Foreign Application Priority Data

Apr. 18, 2005 (JP) ............................ 2005-119849

(51) Int. Cl.
*B32B 38/04* (2006.01)

(52) U.S. Cl. ......................... 156/66; 156/250; 156/252; 156/253; 156/256; 156/268; 156/290; 156/308.4; 156/510; 383/211

(58) Field of Classification Search .................... 156/66
See application file for complete search history.

(56) References Cited

U.S. PATENT DOCUMENTS 4,060,017 A * 11/1977 Backlund ....................... 83/23

FOREIGN PATENT DOCUMENTS

JP 03-039908 B2 6/1991

(Continued)

OTHER PUBLICATIONS

Kabushiki Kaisha Hosokawa, Fastener Bag, Patent abstract of JP Application No. 2002-337890, published Nov. 27, 2002, p. 1.

(Continued)

*Primary Examiner*—Philip C Tucker
*Assistant Examiner*—Vicki Wu
(74) *Attorney, Agent, or Firm*—Millen, White, Zelano & Branigan, P.C.

(57) ABSTRACT

A manufacturing device for manufacturing a reclosable-tape-having bag manufactures a reclosable-tape-having bag in which a reclosable tape is mounted on an inner surface of a bag body 10 while an open tape 23 for ripping and opening the bag body 10 is provided between a mounting base 212 and an upper film 11 of the bag body 10. The manufacturing device for manufacturing the reclosable-tape-having bag includes a notching instrument 110 for forming a notch on the bag body 10. The notching instrument 110 includes: a whole-notching instrument 110A for punching the upper film 11, a lower film 12, the open tape 23 and the mounting base 212 to form a tab on a side seal of the bag body 10; and a half-notching instrument 110B for forming an incision on the lower film 12 and a portion of the mounting base 212 corresponding to a position of the open tape 23.

8 Claims, 14 Drawing Sheets

FOREIGN PATENT DOCUMENTS

| | | | | |
|---|---|---|---|---|
| JP | 2749886 | B | | 5/1998 |
| JP | 2002-224994 | A | | 8/2002 |
| JP | 2002224994 | A | * | 8/2002 |
| JP | 2002-337890 | A | | 11/2002 |
| JP | 2002337890 | A | * | 11/2002 |
| JP | 2006-008211 | A | | 1/2006 |
| WO | WO 00/027721 | A1 | | 5/2000 |

OTHER PUBLICATIONS

Totani Giken Kogyo Kabushiki, Processing Device for Plastic Bag, Patent Abstract of JP Application No. 2002-224994, published Aug. 13, 2002, p. 1.

Kabushiki Kaisha Hiranoya, Patent Abstract of JP Application No. 03-039908 B2, published Jun. 17, 1991, p. 1.

Idemitsu Unitech Co., Ltd., Bag With Fastener-Tape, Patent Abstract of JP Application No. 2006-008211, published Jan. 12, 2006, p. 1.

* cited by examiner

DEVICE AND METHOD FOR MANUFACTURING BAG WITH CHUCK TAPE

TECHNICAL FIELD

The present invention relates to a manufacturing device for a reclosable-tape-having bag and a manufacturing method of the same.

BACKGROUND ART

As a packaging material for seal-packaging various articles such as foods, pharmaceutical and medical products, electronic parts and stationeries, there has been used a bag having a reclosable tape (reclosable-tape-having bag). As such a reclosable-tape-having bag, there has been known a bag that is obtained, for example, by heat-sealing a periphery of superposed packaging materials, heat-sealing a male fastener to an inner surface of one packaging material and a female fastener to an inner surfaces of the other packaging material along a bag opening periphery, and by adhering both the packaging materials at tip ends of the opening periphery.

The reclosable-tape-having bag is initially opened by ripping the tip ends of the bag opening periphery to take out a content, and the reclosable-tape-having bag is resealable and reopenable by fitting the male fastener with the female fastener thereafter.

Manufacturing of such a reclosable-tape-having bag entails operations firstly to seal the male fastener to one packaging material and the female fastener to the other packaging material and subsequently to seal the periphery of the packaging materials for obtaining a bag product. However, when sealing positions of the male fastener and the female fastener to the packaging materials are even slightly misaligned, both the fasteners of the bag product are not well fitted with each other, which may lead to not only high cost due to an increase of defective products but also a complexity of manufacturing operations.

In order for the reclosable-tape-having bag to exhibit its function, an upper portion of the sealed bag (in immediate proximity to the reclosable tape) needs to be opened, and a user often opens the upper portion of the sealed bag by reference to a notch provided at a side seal of the bag. However, it is highly difficult to open the bag by hands levelly along a dotted line printed on the bag. For instance, a cutting line in opening the bag may be curved to cut off the upper portion of the bag in a middle or to conflict with the reclosable tape, whereby a resealing capability of the reclosable tape may be impaired. Thus, a scissors mark are often printed on the bag, thereby recommending the bag be opened using scissors.

However, it may impair a user's convenience to require the user to use the scissors every time the user opens the reclosable-tape-having bag. In addition, there is a limit to improve a cuttability by selecting a film material that forms the bag.

For solving the above-described problems, there has been suggested a reclosable-tape-having bag including an open tape in which a male fastener and a female fastener are attached in engagement to either of packaging materials (e.g., Patent Document 1). FIG. 12 is a front view schematically showing the reclosable-tape-having bag 500 in the vicinity of an opening trigger 550 in accordance with the Patent Document 1, and FIG. 13 shows a cross-sectional view taken along XIII-XIII line in FIG. 12.

The reclosable-tape-having bag 500 shown in FIGS. 12 and 13 is arranged such that a periphery is heat-sealed to form a side seal 600, and that an upper film 501, a male fastener 502, a female fastener 503 (a convex portion 502*a* of the male fastener is fitted with a concave portion 503*a* of the female fastener 503), a cut-off portion 504 (open tape 504) and a lower film 505 are integrated. As shown in FIG. 13, a tab 506 is provided to the side seal 600. When the bag is opened, the tab 506 and the cut-off portion 504 continuously connected with the tab 506 are pulled upward, such that the upper film 501 is simultaneously pulled up to be ripped off.

[Patent Document 1] Japanese Patent No. 2,749,886 ([Claims], [FIG. 1] to [FIG. 8])

DISCLOSURE OF THE INVENTION

Problems to be Solved by the Invention

However, since the arrangement shown in FIGS. 12 and 13, in which the male fastener and the lower film are simultaneously ripped off when the tab is pulled up, requires a great force for opening the bag, the elderly and children, for example, may have difficulty in opening the bag.

Since the great force is required for opening the bag as described above, the male fastener and the lower film of the side seal may not be desirably pulled up with tab and may be cut off at a content side, an improvement of which has been demanded.

Accordingly, an object of the present invention is to provide a manufacturing device and method for a reclosable-tape-having bag that is well openable and resealable, the reclosable-tape-having bag facilitating and simplifying an unsealing operation with no great force required in an initial unsealing.

Means for Solving the Problems

A manufacturing device for a reclosable-tape-having bag according to an aspect of the present invention is a manufacturing device for a reclosable-tape-having bag, the reclosable-tape-having bag including a first base material and a second base material, the first base material and the second base material being superposed together so that a periphery of the base materials are joined to form a bag body, a reclosable tape having a male fastener and a female fastener that are engageable with each other, the reclosable tape being mounted on an inner surface of the first base material of the bag body, an open tape being adapted to rip and open the bag body and provided between a mounting base of either the male fastener or the female fastener and the first base material of the bag body, the manufacturing device including a notching instrument that notches the bag body, in which the notching instrument includes: a whole-notching instrument that punches the first base material, the second base material, the open tape and the mounting base to form a tab on an opening trigger provided on a side seal of the bag body; and a half-notching instrument that forms an incision on the second base material and a portion of the mounting base corresponding to a position of the open tape, and the whole-notching instrument and the half-notching instrument are adjacently provided such that the tab formed by the whole-notching instrument is substantially continuously connected with the incision formed by the half-notching instrument.

Both of the first base material and the second base material are a thin base material that forms the bag body from both sides, an example of which is a synthetic resin film that is heat-sealable with each other by heat.

The manufacturing device for the reclosable-tape-having bag according to the present invention includes the predetermined whole-notching instrument and the predetermined half-notching instrument, which respectively forms the tab and the incision on the side seal of the bag body, thereby providing a structure in which the tab and the incision are substantially continuously connected with each other (hereinafter also referred to as, "easy-open structure"). With this arrangement, when a user pulls up the open tape to rip and open the bag body, there is no need to rip the mounting base abutting on the open tape (e.g. the mounting base of the male fastener), thereby providing a reclosable-tape-having bag that is openable by pinching the tab to open only the film of an opposite side of the bag body with a small force.

The "continuous connection of the tab formed by the whole-notching instrument and the incision formed by the half-notching instrument" herein means either that the tab and the incision are directly bonded or that the tab and the incision are arranged on the bag body with a slight space interposed therebetween. When the tab and the incision interposes the slight space therebetween, the tab and the incision are substantially continuously connected with each other, as long as the bag body forming the gap is easily ripped when the tab is pinched to open the bag body.

According to the aspect of the present invention, the incision formed by the half-notching instrument preferably reaches to at least the vicinity of the open tape. For instance, it is preferable that the incision reaches an immediate position to contact the open tape or that the incision slightly intrudes into a surface layer of the open tape. With this arrangement, when the tab is pulled up, a ripping resistance caused by the mounting base is small or no ripping resistance is caused by the mounting base, whereby the opening process is further facilitated.

In addition, the "adjacent" arrangement of the whole-notching instrument and the half-notching instrument includes an arrangement in which both the instruments are physically integrated. As an example, a metal blade as the whole-notching instrument and a metal blade as the half-notching instrument may be integrated to physically form one metal blade.

Incidentally, the "opening trigger" in the present invention represents a region in which the tab and the like for opening the reclosable-tape-having bag are provided.

In the manufacturing device for the reclosable-tape-having bag according to the aspect of the present invention, it is preferable that the notching instrument including the whole-notching instrument and the half-notching instrument includes a notching blade that punches the bag body or forms the incision and an anvil that receives the notching blade.

According to the aspect of the present invention, since the notching instrument is rather simply formed by the notching blade and the anvil for receiving the blade, the notching instrument can be easily installed in a manufacturing line of a general bag manufacturing machine, which is advantageous in terms of convenience.

In the manufacturing device for the reclosable-tape-having bag according to the aspect of the present invention, it is preferable that the notching blade is integrally formed by a whole-notching blade that forms the whole-notching instrument and a half-notching blade that forms the half-notching instrument.

The "integral formation" herein means not only an arrangement in which the blades are physically integrated but also an arrangement in which the blades are in contact with each other or the blades are adjacently provided. In short, the "integral formation" means that the blades perform a punching and an incision forming on the film substantially at the same time.

According to the present invention, since the tab and the easy-open structure can be simultaneously formed by the integrated notching blades, the reclosable-tape-having bag having the open tape with the tab can be manufactured more conveniently. As the notching blade, for example, a Thomson blade and the like are desirable.

In the manufacturing device for the reclosable-tape-having bag according to the aspect of the present invention, it is preferable that the notching blade provides the whole-notching blade that punches the bag body and the half-notching blade that forms the incision on the bag body by providing a step to the anvil.

According to the aspect of the present invention, not the notching blade itself but the anvil for receiving the blade is provided with a step to perform the punching (whole-notching) and the incision forming (half-notching). Thus, there is no need to provide a step to the notching blade, thereby enhancing the convenience of the bag manufacturing.

In the manufacturing device for the reclosable-tape-having bag according to the aspect of the present invention, it is preferable that the whole-notching blade that punches the bag body and the half-notching blade that forms the incision on the bag body are provided by providing a step to the notching blade.

According to the aspect of the present invention, the notching blade is provided with a step to perform the punching and the incision forming on the bag body. Thus, a general anvil having a flat and smooth surface can be used as the anvil while a notching blade can be suitably selected for punching and incision forming. In addition, when the notching blade is directly provided with the step, positions of the whole-notch and the half-notch on the bag body can be accurately determined as compared with a case where the anvil is provided with the step.

In the manufacturing device for the reclosable-tape-having bag according to the aspect of the present invention, it is preferable that a protection film that protects the notching blade is provided between the anvil and the notching blade.

According to the aspect of the present invention, since the protection film for protecting the blade forming the notching instrument is interposed between the anvil and the bag body, damages on the notching blade can be effectively prevented, thereby prolonging a lifetime of the notching blade.

As the protection film, a laminate film in which a stretched film and a non-stretched film are laminated together is preferably used, and for instance the protection film may be arranged such that the stretched film faces the notching blade side while the non-stretched film faces the anvil side. The use of the stretched film can prevent the film forming the bag body from being clamped into the protection film and also prevent the protection film from being broken. As the protection film, it is preferable to use a laminate film formed of the following exemplary combinations: a combination of biaxial oriented polypropylene (OPP) and casted polypropylene (CPP) and a combination of biaxial oriented polyethylene terephthalate (OPET) and linear low-density polyethylene (LL). Further, as a simplification, the same advantage can be obtained by attaching a film tape with an adhesive to the anvil.

In the manufacturing device for the reclosable-tape-having bag according to the aspect of the present invention, it is preferable that an end-to-end distance of the half-notching blade is wider than a terminal-to-terminal distance of the whole-notching blade.

According to the aspect of the present invention, since the end-to-end distance of the half-notching blade for forming the incision on the bag body is set to be wider than the terminal-to-terminal distance of the whole-notching blade for punching the bag body, the incision of the whole-notch is formed by the half-notching instrument, such that the incision is reliably conveyed to the half-incised portion.

With this arrangement, since the incision of the whole-notch outwardly extends from the incised portion when the bag is opened, it is possible to prevent the operation of ripping and opening the bag body by the open tape from being hampered.

A manufacturing method for a reclosable-tape-having bag according to another aspect of the present invention is a manufacturing method for a reclosable-tape-having bag, the reclosable-tape-having bag including a first base material and a second base material, the first base material and the second base material being superposed together so that a periphery of the base materials are joined to form a bag body, a reclosable tape having a male fastener and a female fastener that are engageable with each other, the reclosable tape being mounted on an inner surface of the first base material of the bag body, the manufacturing method including steps of: providing an open tape between a mounting base of either the male fastener or the female fastener and the first material of the bag body, the open tape being adapted to rip and open the bag body; punching the first base material, the second base material, the open tape and the mounting base to form a tab on an opening trigger provided on a side seal of the bag body by a whole-notching instrument; forming an incision on the second base material and a portion of the mounting base corresponding to a position of the open tape by a half-notching instrument; and substantially continuously connecting the tab formed by the whole-notching instrument with the incision formed by the half-notching instrument.

According to the manufacturing method for the reclosable-tape-having bag of the present invention, there is provided on the side seal of the bag body a structure in which the tab formed by the whole-notching instrument and the incision formed by the half-notching instrument are substantially continuously connected with each other (the easy-open structure), thereby providing a reclosable-tape-having bag that is easily openable by opening only the film forming one surface of the bag body using the open tape.

EXPLANATION OF CODES

Figure 1:
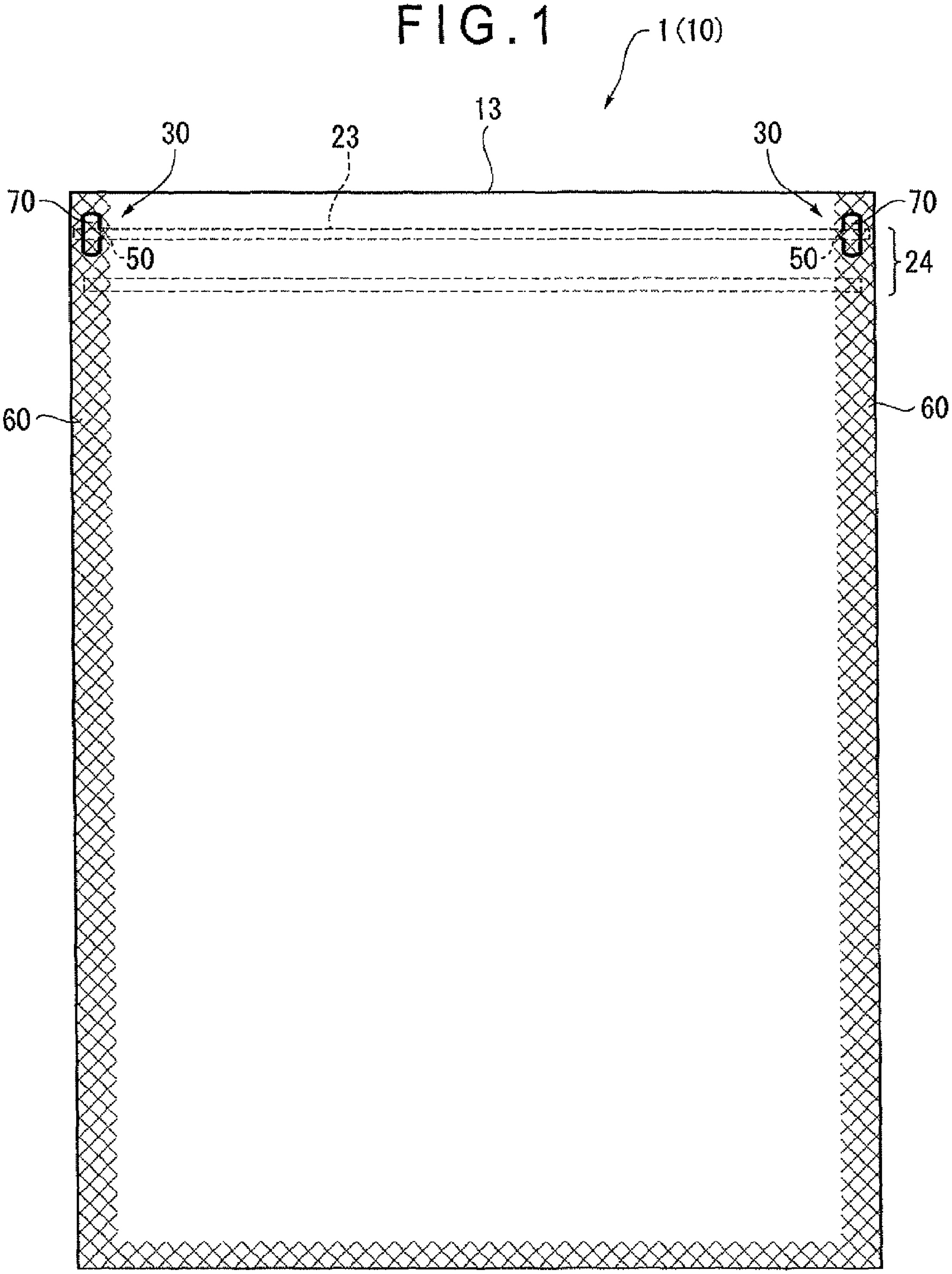
FIG. 1 is a front view showing a reclosable-tape-having bag (bag body) according to a first embodiment of the present invention.

1: reclosable-tape-having bag
10: bag body
10A: inner surface
11: upper film (first base material)
11A: whole-notch
12: lower film (second base material)
13: opening
20: reclosable tape
21: male fastener
22: female fastener
23: open tape
24; opening portion
30: opening trigger
50: incision
50*a*: incision
50*b*: incision
60: side seal
70: tab
100: manufacturing device
101: vertical seal-bar
102: horizontal seal-bar
110,1100: notch-forming machine (notching instrument)
100A, 1100A: whole-notching instrument
110B, 1100B: half-notching instrument
111, 1110: Thomson blade
111A, 1110A: whole-notching blade
111B, 1110B: half-notching blade
112,1120: anvil
114,1140: blade receiving table
115,1150: blade fixing table
212: mounting base
222: mounting base
300: protection film
400: tab
410; whole-incised portion
411: half-incised portion
412: incision extension

BEST MODE FOR CARRYING OUT THE INVENTION

Embodiments of the present invention will be described below with reference to the attached drawings.

Figure 2:
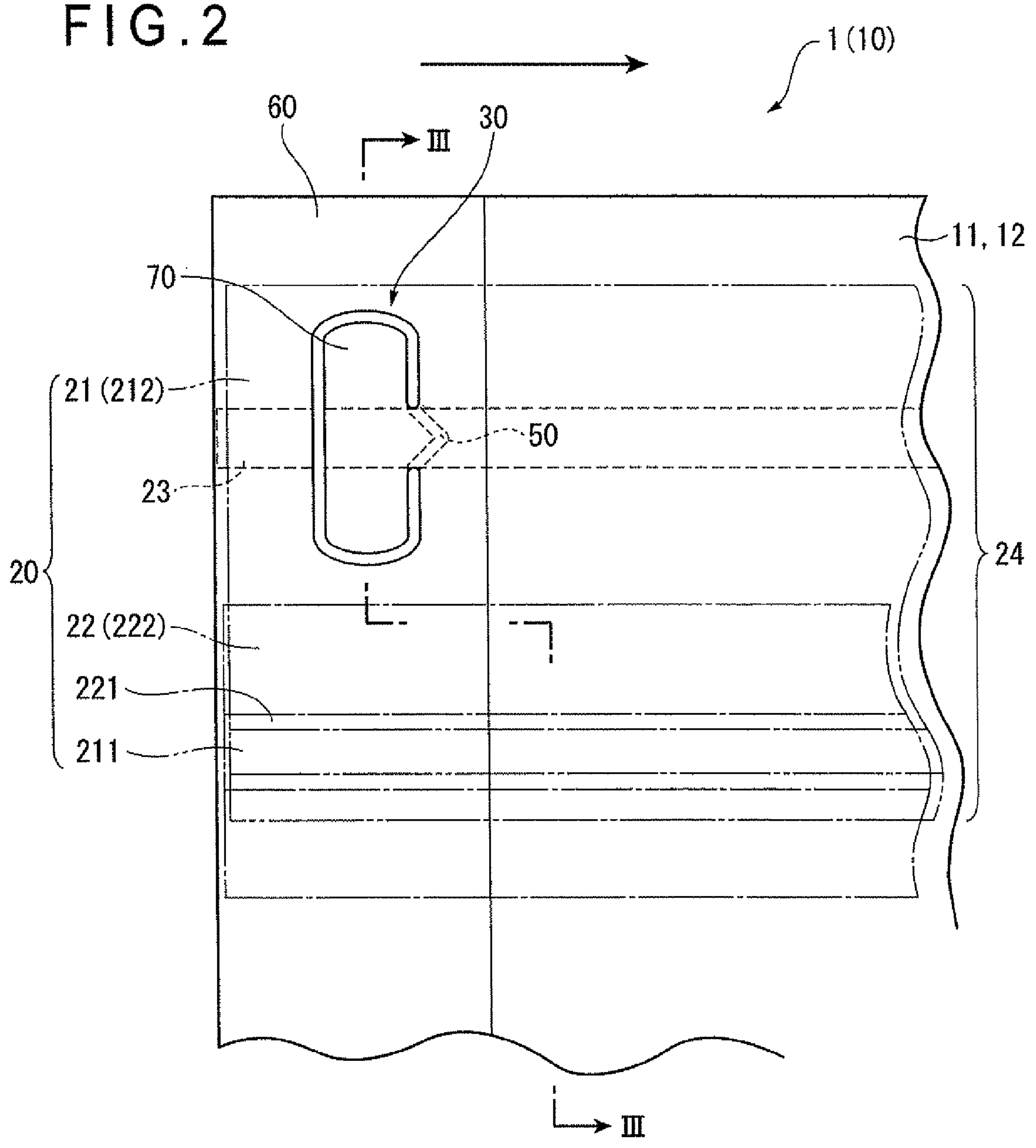
FIG. 2 is a front view showing the vicinity of an opening trigger on which a tab is provided in FIG. 1.

Although an arrow in FIG. 2 indicates a basic opening advancing direction, a bag can be opened from both sides in actuality owing to tabs 70 provided on a right and left sides of an upper portion of the bag. Of course, the tab 70 may be provided to either one of the right side or the left side of the upper portion of the bag.

Figure 3:
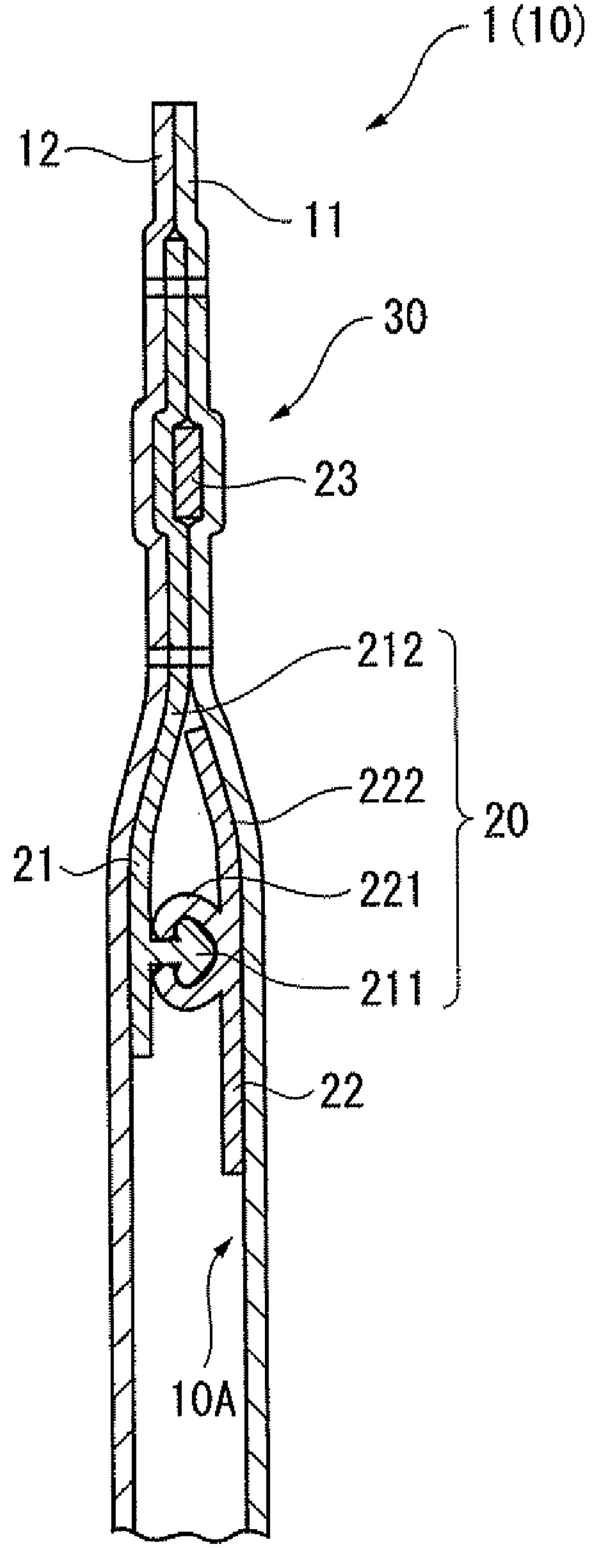
FIG. 3 is a cross-sectional view taken along III-III line in FIG. 2.

A reclosable-tape-having bag 1 shown in FIGS. 1 to 3 is formed such that a reclosable tape 20 is attached to a bag body 10 that is formed by laying an upper film 11 as a first base material with a lower film 12 as a second base material and sealing a periphery thereof, the reclosable tape 20 being attached to an inner surface 10A of the upper film 11.

A packaging material for forming the bag body 10 (upper film 11, lower film 12) is preferably formed of a single-layered or multi-layered film, and a single-layered or multi-layered film formed of a thermoplastic resin or resins as follows may be used as the packaging material: oriented polyethylene terephthalate (OPET), oriented polypropylene (OPP), linear low-density polyethylene (LLDPE), cast polypropylene (CPP) and the like.

An aluminum foil and the like may be evaporated and laminated in the multi-layered film formed of the thermoplastic resins, an aluminum evaporation layer, whereby the film may have properties such as a gas barrier property and a light blocking property.

The reclosable tape 20 attached to the bag body 10 is adhesion-fixed to the inner surface 10A of the upper film 11 for forming the bag 10 as shown in FIGS. 2 and 3. Although the bag body 10 and the reclosable tape 20 may be joined using an adhesive instead of heat-sealing, it is preferable that the bag body 10 and the reclosable tape 20 are heat-sealed as in the present embodiment since operations can be simplified.

The reclosable tape 20 is formed by a male fastener 21 and a female fastener 22. The male fastener 21 has a convex portion 211 that is substantially arrowhead-shaped or mushroom-shaped and a mounting base 212 that is wider than a below-described mounting base 222 of the female fastener 22, and the male fastener 21 is adhesion-fixed such that the wider mounting base 212 is heat-sealed to a back surface of the upper film 11 (inner surface 10A side of the bag body 10). Incidentally, the shapes of the male fastener and the female fastener are not particularly limited as long as both the fasteners are engageable with and disengageable from each other.

The female fastener 22 has a concave portion 221 that is fitted with the convex portion 211 of the male fastener 21 and the mounting base 222, and the mounting base 222 is heat-sealed to the back surface of the upper film 11 (inner surface 10A side of the bag body 10).

Considering moldability and heat-sealing property, the male fastener 21 and the female fastener 22 are preferably formed of a polyolefin-based resin examples of which is a polyethylene-based resin such as low-density polyethylene, a polypropylene-based resin or a polyolefin-based resin such as a copolymer of these resins, and the fasteners can be continuously molded by a molding method such as extruding these polyolefin-based resins. Thickness of the mounting bases 212, 222 of the male fastener 21 and the female fastener 22 may be desirably determined (for example, approximately 100 to 200 μm) as long as the fitting of the convex portion 211 and the concave portion 221 is secured and the reclosable-tape-having bag 1 retains a desirable flexibility.

In the reclosable-tape-having bag 1, an opening portion 24 that includes an open tape 23 for ripping and opening the bag body 10 is provided, and the open tape 23 is provided between the mounting bases 212, 222 of the male fastener 21 and the female fastener 22.

In the present embodiment, the opening portion 24 is provided on a region where the open tape 23 intersects with the side seal 60 provided at an opening 13 of the bag body 10 to which the male fastener 21 is attached. In addition, the open tape 23 is sealed to the back surface of the upper film 11 and joined with the mounting base 212 by pseudo-adhesion in a peelable manner.

The open tape 23 may be formed of oriented polyethylene terephthalate (OPET), oriented polypropylene (OPP), oriented high-density polyethylene (HDPE) and the like. One surface of the open tape 23 (a surface facing the inner surface 10A of the upper film 11) may be applied with an adhesive and the like to be desirably attached to the inner surface 10A of the upper film 11. On the other hand, the other surface of the open tape 23 (a surface facing the mounting base 212) may be applied with an easy peeling agent and the like, thereby preventing a defective sealing of the open tape 23 and the side seal 60.

Although a width of the open tape 23 is not particularly limited, the width of, for example, approximately 1 to 5 mm may be preferable since the reclosable-tape-having bag 1 can be desirably opened.

Figure 4:
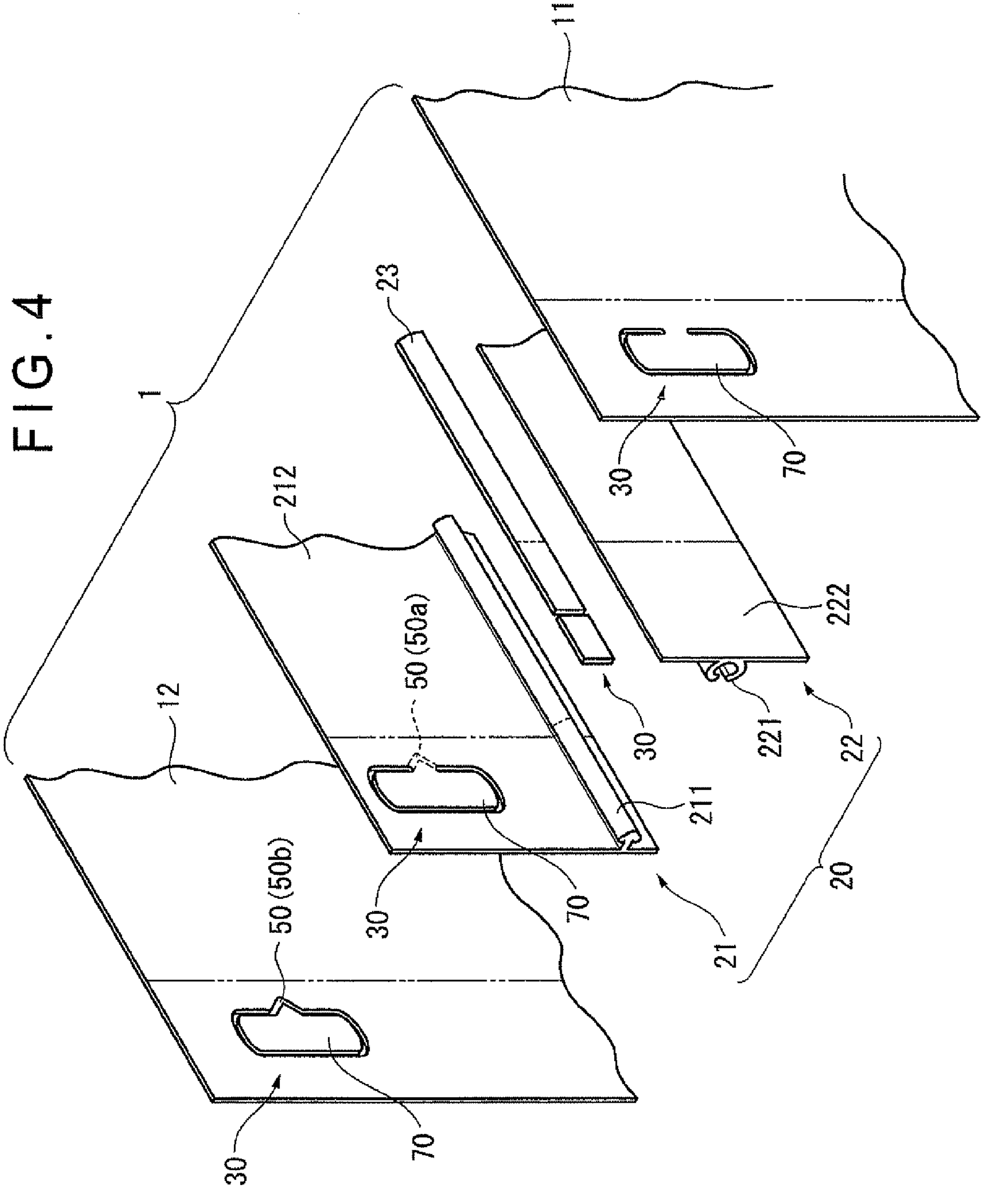
FIG. 4 is an exploded perspective view schematically showing an arrangement of the reclosable-tape-having bag in the vicinity of the opening trigger according to the embodiment.

FIG. 4 is an exploded view schematically showing an arrangement of the reclosable-tape-having bag 1 in the vicinity of an opening trigger 30, the bag 1 being manufactured by a below-described manufacturing device.

In the reclosable-tape-having bag 1, the upper film 11, the mounting base 222 of the female fastener 22, the open tape 23, the mounting base 212 of the male fastener 21 that is wider than that of the female fastener 22 and the lower film 12 are arranged to be superposed.

In the side seal 60, a tab 70 as the opening trigger 30 is formed by punching. An incision 50 (50*a*, 50*b*) formed by a below-described half-notching blade is provided respectively in the mounting base 212 of the male fastener 21 that is in contact with the open tape 23 and the lower film 12.

The tab 70 and the incision 50 are both positioned inside the side seal 60.

Figure 7A:
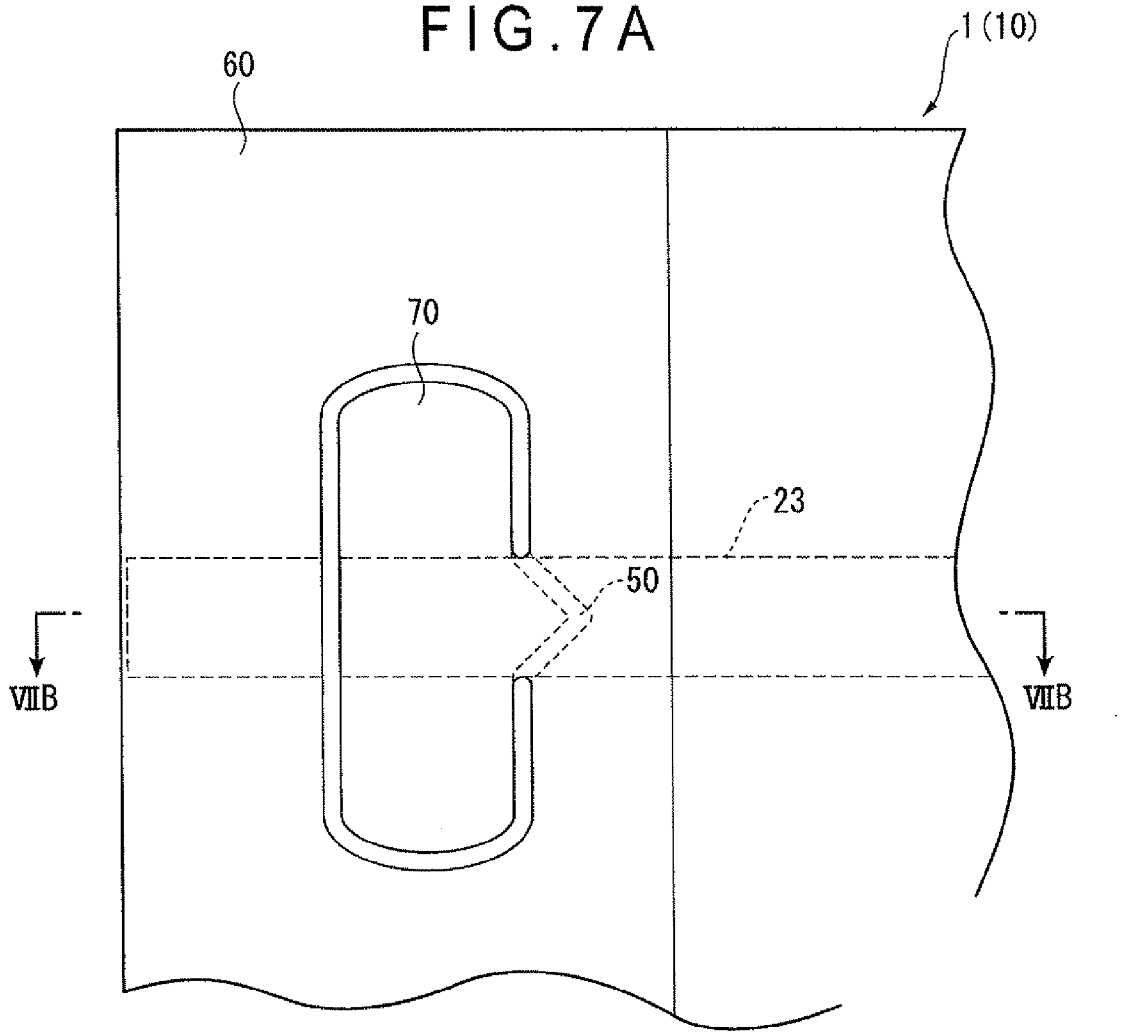
FIG. 7A is a front view showing a punched portion of a film according to the embodiment.

A shape of the incision 50 (a contour formed by the half-notching blade) is not particularly limited and may include linear, semicircular, semielliptic and substantially polygonal shapes in addition to substantially triangular shape shown in FIG. 7A. When the shape of the incision 50 is other than linear, what is called an incision fragment is formed inside the incision 50.

A shape of the tab 70 is not particularly limited, as long as the tab 70 is easily pinched and pulled up.

[Manufacturing Device for Resealable-Tape-Having Bag 1]

Next, a manufacturing device for the reclosable-tape-having bag 1 will be exemplarily described.

Figure 5:
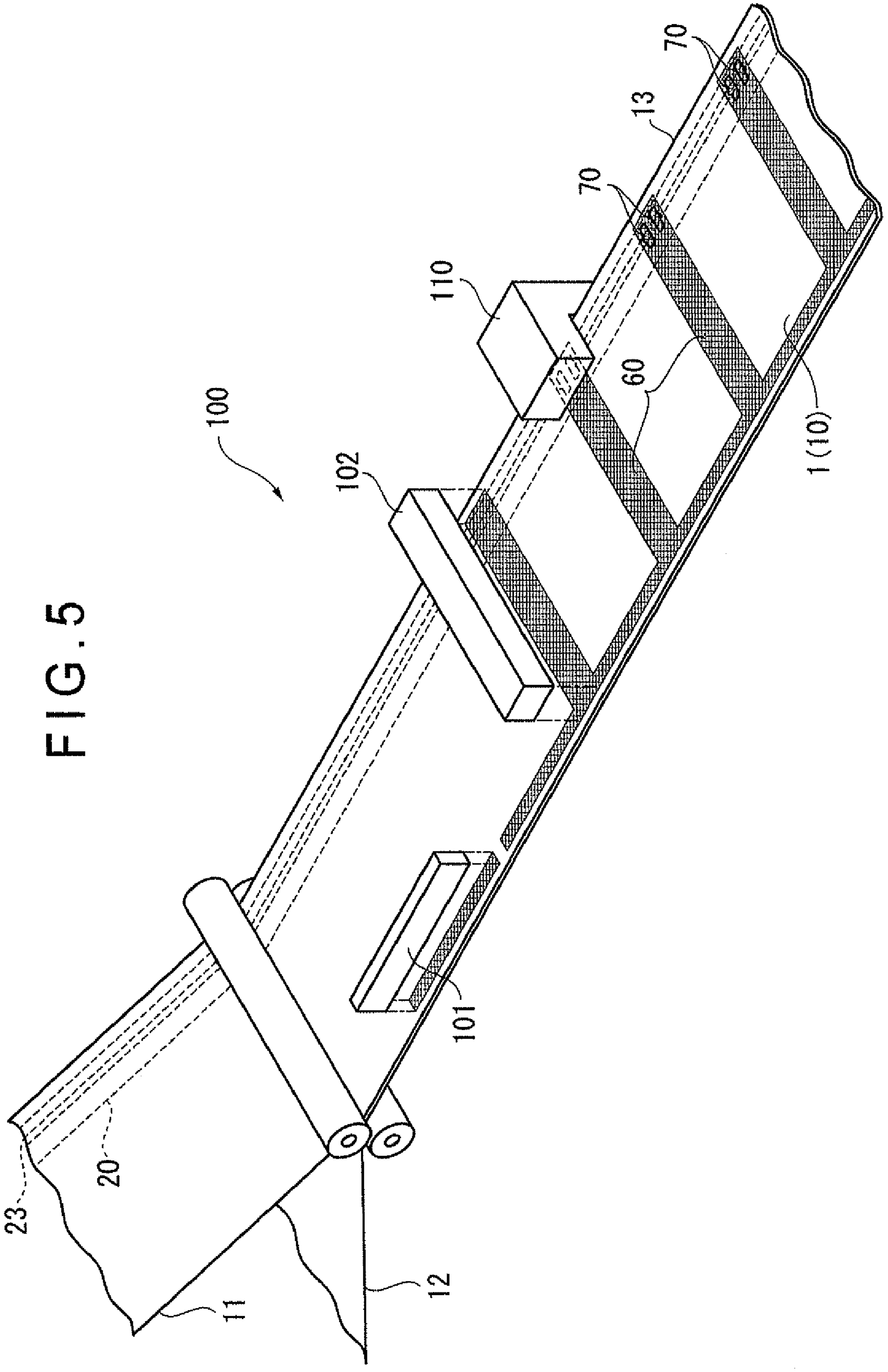
FIG. 5 is an illustration schematically showing a manufacturing device for the reclosable-tape-having bag according to the embodiment.

FIG. 5 is a front view showing a manufacturing device 100 for the reclosable-tape-having bag 1 according to an embodiment of the present invention. The manufacturing device 100 for the reclosable-tape includes: a vertical seal-bar 101 for heat-sealing the upper film 11 to the lower film 12; a horizontal seal-bar 102; and a notch-forming machine 110 as a notching instrument.

The upper film 11 and the lower film 12 inserted into the manufacturing device 100 are heat-sealed together to form the reclosable-tape-having bag 11 (bag (10)).

The reclosable tape 20 is sealed to a lower surface of the upper film 11 in advance, and the open tape 23 is attached to the lower surface of the upper film 11.

Figure 6A:
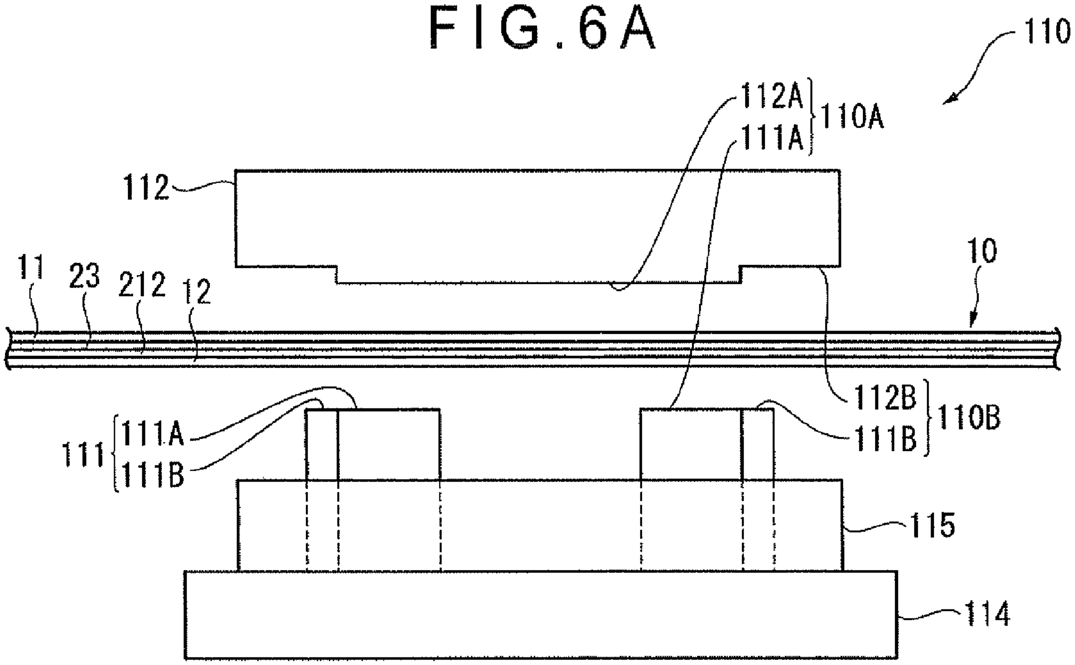
FIG. 6A is a side view schematically showing a notch-forming machine according to the embodiment.

FIG. 6A is a side view schematically showing the notch-forming machine 110 as the notching instrument. The above-described upper film 11 and the lower film 12 pass through the notch-forming machine 111 in a laminated state. The notch-forming machine 110 includes a Thomson blade 111 as a notching blade and a rectangular anvil 112 for receiving the blade. The Thomson blade 111 is fixed by a blade bearing table 115 and a blade fixing table 115, and the blade is applied to the bag from the lower film 12 side. The anvil 112, on which a step is provided, includes a convex portion 112A substantially quadrangular in cross-section and a concave portion 112B forming a circumference of the convex portion 112A.

The Thomson blade 111 includes: a whole-notching blade 111A for punching the upper film 11, the open tape 23, the mounting base 212 and the lower film 12 by contacting the convex portion 112A of the anvil 112; and a half-notching blade 111B for notching the lower film 12 and the mounting base 212 while maintaining a slight gap with the concave portion 112B of the anvil 112. In short, the whole-notching blade 111A and the convex portion 112A of the anvil 112 provide a whole-notching instrument 110A while the half-notching blade 111B and the concave portion 112B of the anvil 112 provide a half-notching instrument 110B.

Figure 6B:
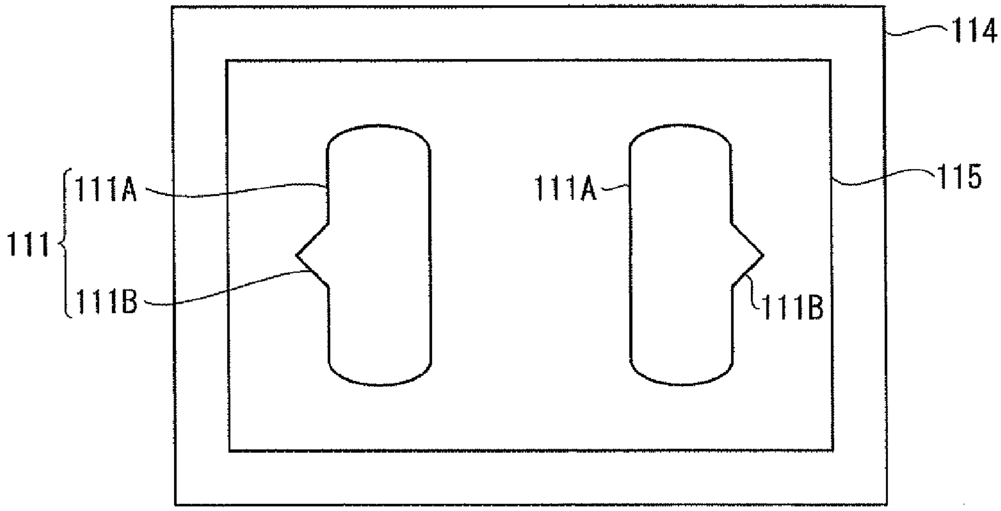
FIG. 6B is a top view schematically showing a Thomson blade according to the embodiment.

FIG. 6B is a top view schematically showing a Thomson blade 111. In the illustration, the Thomson blade is provided in pair. The step provided on the anvil 112 differentiates the whole-notching blade 111A substantially elliptical in cross-section from the half-notching blade 111B substantially triangular in cross-section. There is no step provided to the Thomson blade 111 itself. The gap between the half-notching blade 111B and the concave portion 112B of the anvil 112 is substantially equal to the thickness of the upper film 11 and the open tape 23.

As a matter of course, the Thomson blade 111 may be conversely provided with the step while the anvil 112 may be made flat, or these methods may be used together. A shape of the Thomson blade is not limited to that in FIG. 6B but may include various shapes.

[Manufacturing Method for Resealable-Tape-Having Bag 1]

Next, a manufacturing method for a reclosable-tape-having bag 1 will be exemplarily described.

Initially, after being molded by extrusion-forming and the like, the male fastener 21 and the female fastener 22 are placed on the packaging material forming the bag body 10 in engagement to be fixed to the bag body 10 by heat-sealing and the like. The open tape 23 is attached to the bag body 10 at a middle position between the fixing positions of the fasteners 21, 22.

The other packaging material is superposed on the packaging material to which the male fastener 21 and the female fastener 22 are welded, and as shown in FIG. 5, the packaging materials are heat-sealed by the vertical seal-bar 101 and the horizontal seal-bar 102 to form the side seal 60.

Then, the notch-forming machine 110 simultaneously forms a whole notch (punching) and a half notch (incision) at the intersection of the open tape 23 and the side seal 60 by applying the Thomson blade 111 from the lower film 12 side. Specifically, the whole-notching instrument 110A forms the tab 70A while the half-notching instrument 110B incises the lower film 12 and the portion of the mounting base 212 on which the open tape 23 is positioned to form an incision 50 (50*a*, 50*b*). The incision 50*a* is formed on the mounting base 212 of the male fastener 21 while the incision 50*b* is formed on the lower film 12.

The tab 70 formed by the whole-notching instrument 110A and the incision 50 formed by the half-notching instrument 110B are substantially continuously connected with each other to form an easy-open structure.

Then, the side seal 60 is severed by a desired means, and the reclosable-tape-having bag 1 is obtained in which three sides except for the opening 13 are heat-sealed. When the opening 13 is joined by heat-sealing and the like after a content is filled into the inside of the bag body 10 from the opening 13, a hermetically-sealed reclosable-tape-having bag 1 is obtained in which the content is filled.

[Opening Operation of Resealable-Tape-Having Bag 1]

Figure 7B:
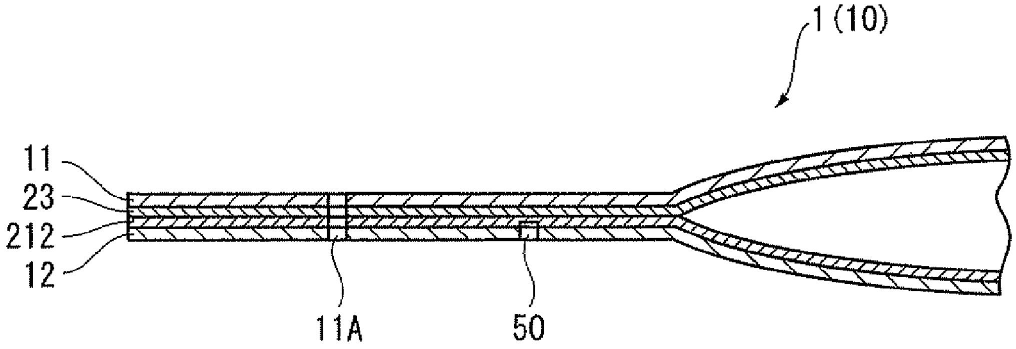
FIG. 7B is a cross-sectional view showing the punched portion of the film according to the embodiment.

FIG. 7A is a front view showing a portion of the films 11, 12 having been punched by the Thomson blade 111 and the anvil 112, and FIG. 7B shows a cross-section take along VIIB-VIIB line. The drawing show the difference between the whole notch 11A having been punched by the whole-notching blade 111A of the Thomson blade 111 and the incision 50 formed to reach the vicinity of the open tape 23.

In order to secure an easy-open property of the bag, the incision 50 is preferably deep enough to penetrate at least the mounting base 212 of the reclosable tape 20 internally laminated to the bag body 10.

In FIG. 7B, even when the incision 50 is deep enough to intrude into the open tape 23, there is no problem as long as the open tape 23 is not torn off at the time of pinching the tab to open the bag, which is rather preferable for the easy-open property. However, even in the case described above, it is preferable that the intrusion of the incision into the open tape 23 is one third or less of the thickness of the open tape 23. When the intrusion of the incision into the open tape 23 is more than one third of the thickness of the open tape 23, there is a risk that the open tape 23 is tore off around the incision 50 at the time of opening the bag body 10, which impairs the openability of the bag thereafter.

Figure 8A:
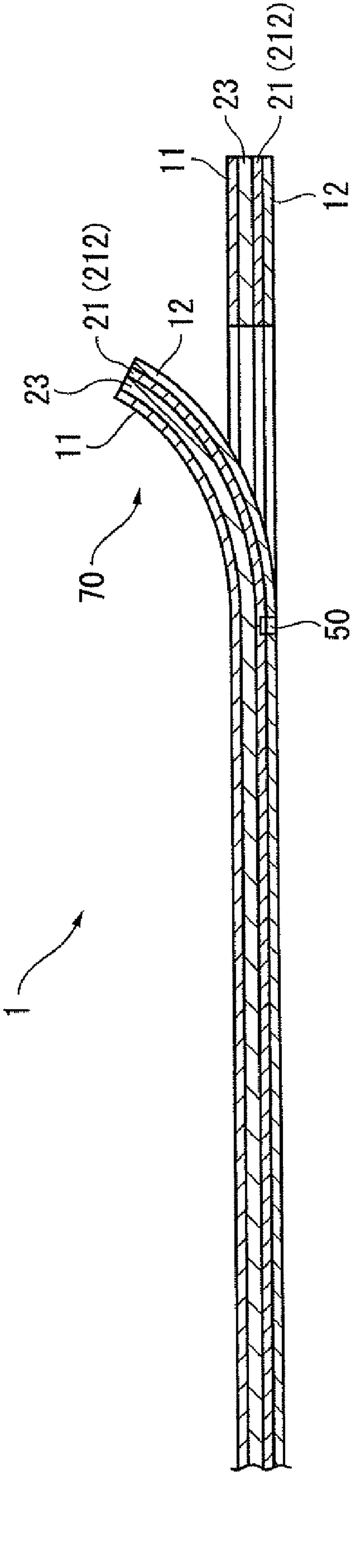
FIG. 8A is an illustration showing an open state of the reclosable-tape-having bag shown in FIGS. 7A and 7B.
Figure 8B:
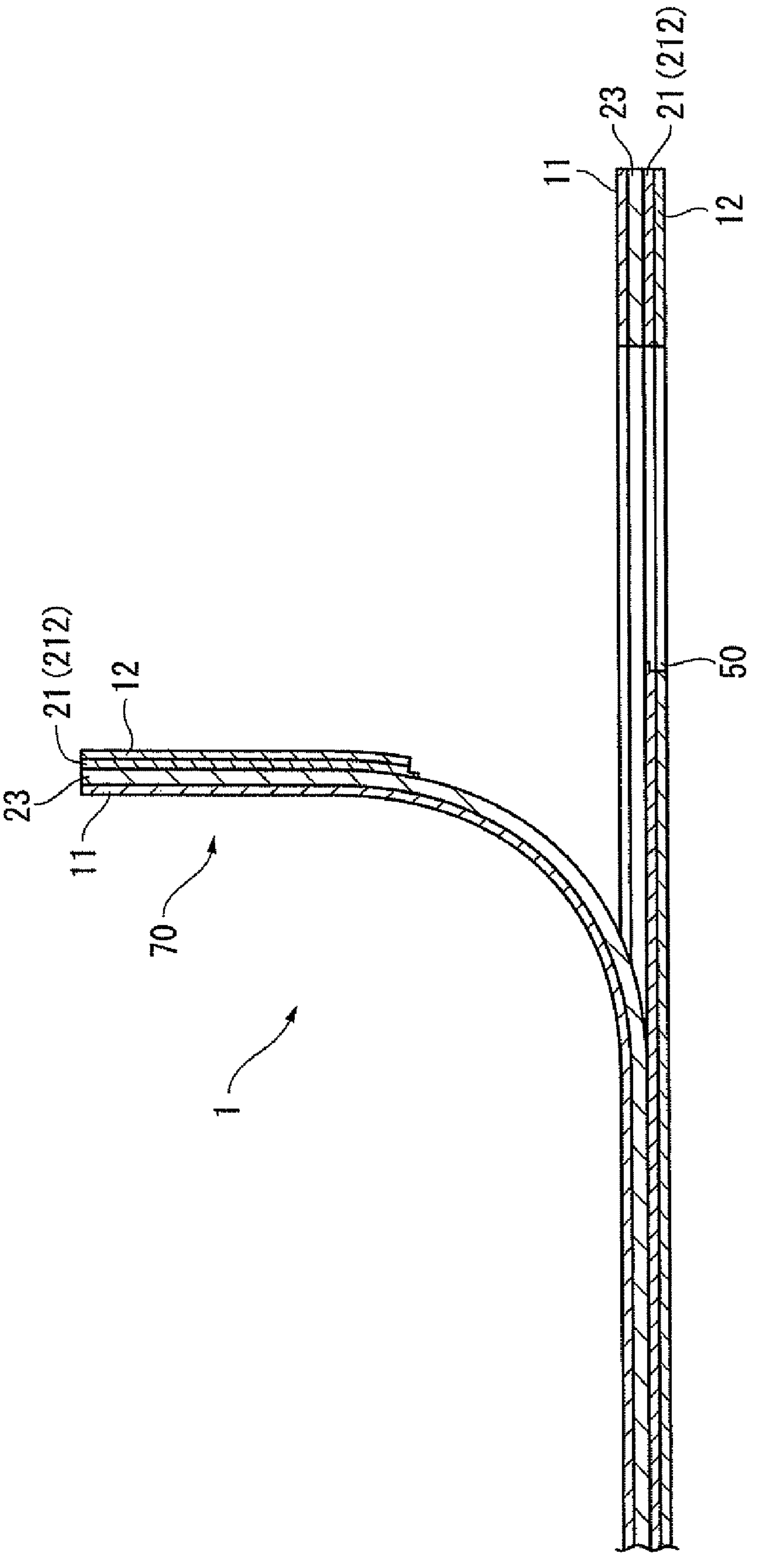
FIG. 8B is an illustration showing an open state of the reclosable-tape-having bag shown in FIGS. 7A and 7B.

FIGS. 8A and 8B are illustrations showing an open state of the reclosable-tape-having bag according to the present embodiment.

When the tab 70 is pulled up as shown, the upper film 11, the open tape 23, the mounting base 212 of the male fastener 21 and the tab 70 of the lower film, which are joined together, are also pulled up (FIG. 8A). On the other hand, since the substantially triangular incision 50 is formed in the mounting base 212 of the male fastener 21 and the lower film 12, the mounting base 212 and the lower film 12 subsequent to the incision 50 are not ripped off, such that only the open tape 23 and the upper film 11 are ripped to form the opening.

According to the present embodiment described above, the following advantages can be obtained.

(1) Since the opening trigger 30 formed on the side seal 60 of the bag body 10 has a structure in which the tab 70 formed by the whole-notching blade 111A and the incision 50 formed by the half-notching blade 111B are substantially continuously connected with each other (the easy-open structure), there is no need to rip off the mounting base 212 and the lower film 12 abutting on the open tape 23 even when the open tape 23 is pulled up to rip off and open the bag body 10, thereby providing the reclosable-tape-having bag 1 that is openable with a small force. Specifically, since the incision 50 formed by the half-notching blade 111B penetrates the lower film 12 of the bag body 10 to reach the mounting base 212, a user can easily rip off only the open tape 23 and the upper film 11 of the bag body 10 by pinching the tab 70.

(2) Since the tab 70 and the incision 50 of the opening trigger 30 are provided inside the side seal 60, the bag is excellent in sealing performance when the bag is unopened. Further, by utilizing the side seal 60, the easy-open structure can be easily formed in a bag manufacturing operation.

(3) Since the depth of the incision 50 can be variously modified by merely providing the step to the anvil 112, the opening property can be easily modified, which is practically convenient.

The above-described embodiment merely exemplarily shows an embodiment of the present invention, and the present invention is not limited to the above-described embodiment but may include modifications and improvements in the scope of the present invention as long as the object and the advantage of the present invention can be achieved. In addition, specific arrangements and profiles when implementing the present invention may be other structures and profiles as long as an object and an advantage of the present invention can be achieved.

Figure 9A:
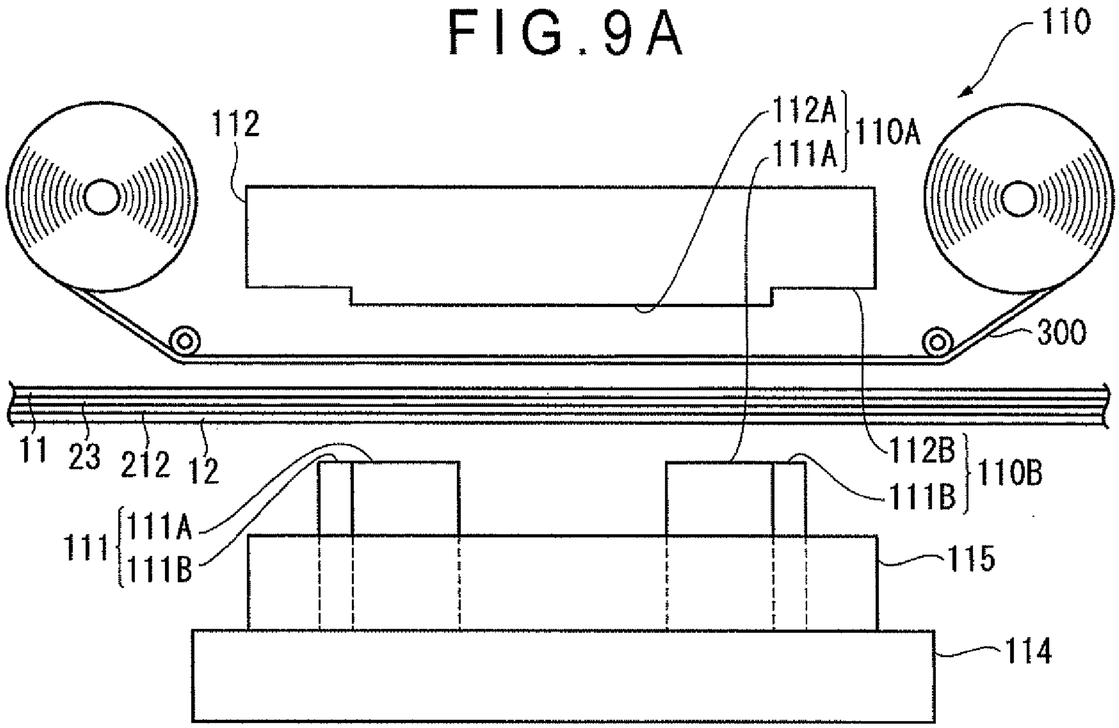
FIG. 9A is a side view schematically showing a manufacturing device for a reclosable-tape-having bag according to a second embodiment.
Figure 9B:
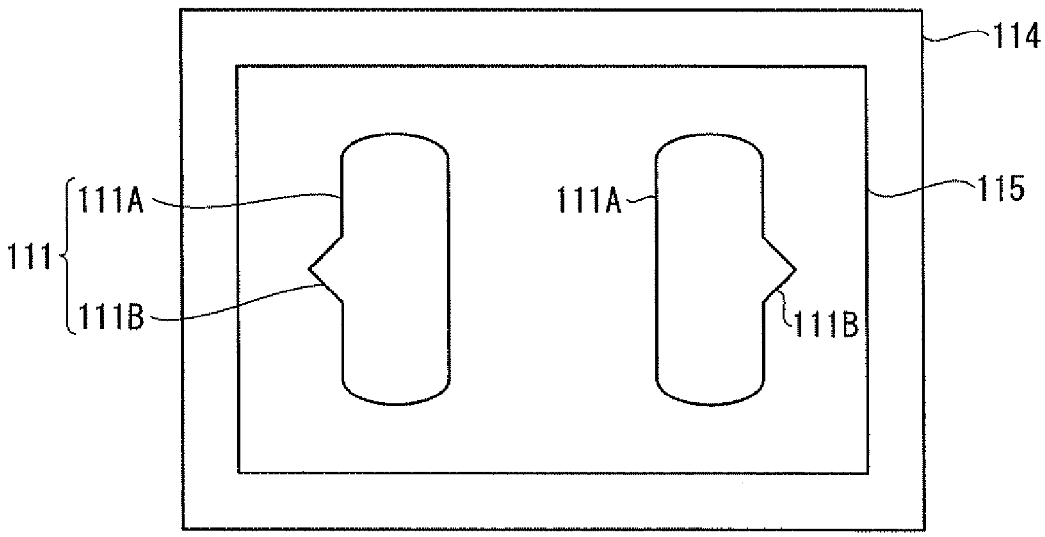
FIG. 9B is a top view schematically showing the manufacturing device for the reclosable-tape-having bag according to the second embodiment.

For example, as shown FIG. 9A, a protection film 300 may be interposed between the Thomson blade and the anvil 112. This arrangement is advantageous because lifetimes of the notching blade and the anvil can be maintained considerably long, and a punching operation can be reliably performed even when a contact-pressure of the whole-notching blade 111A and the concave portion 112A of the anvil 112 is not constant.

When the protection film 300 is used, the gap between the half-notching blade 111B and the concave portion 112B of the anvil 112 is substantially equal to the thickness of the upper film 11 and the open tape 23 plus the thickness of the protection film 300.

Figure 10A:
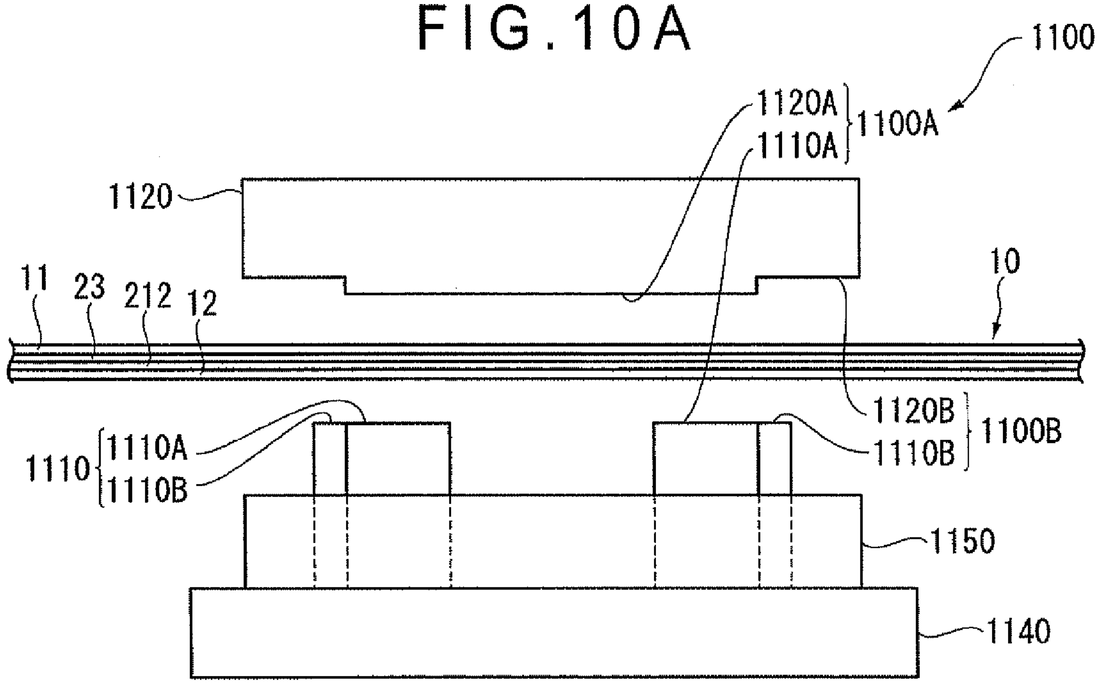
FIG. 10A is a side view schematically showing a notch-forming machine according to the second embodiment.
Figure 10B:
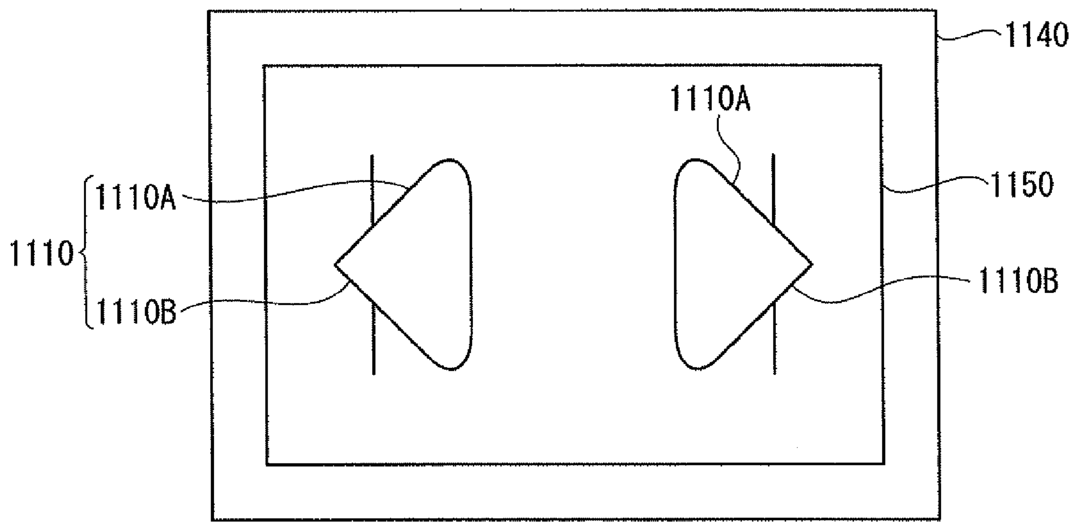
FIG. 10B is a top view schematically showing a Thomson blade according to the second embodiment.

As a second embodiment, an end-to-end distance (B) of a half-notching blade 1110B for forming an incision on the bag body 10 may be set wider than a terminal-to-terminal distance (A) of a whole-notching blade 1110A for punching the bag body 10 as shown in FIG. 10B.

Figure 11:
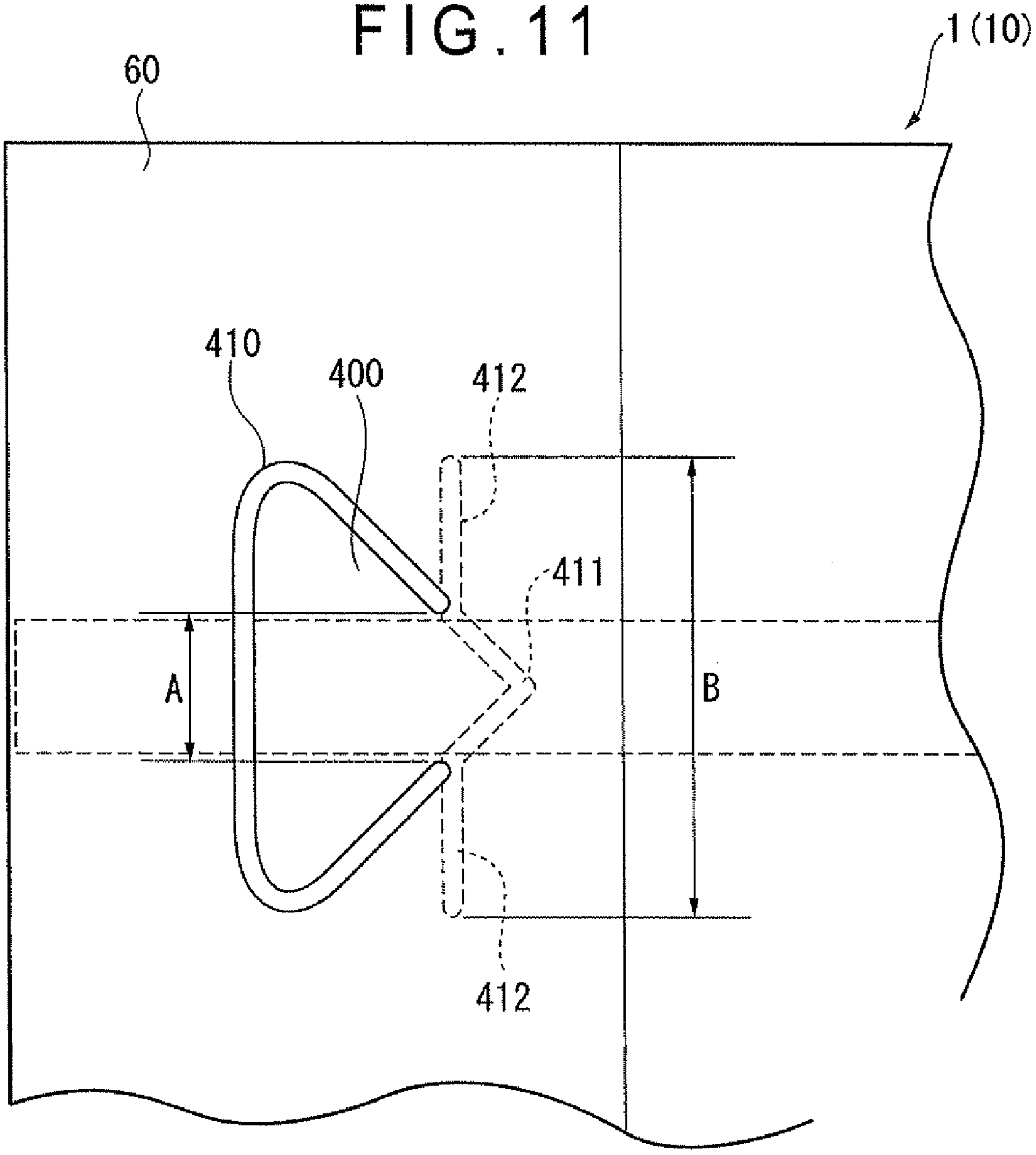
FIG. 11 is a front view showing a punched portion of a film according to the second embodiment.
Figure 12:
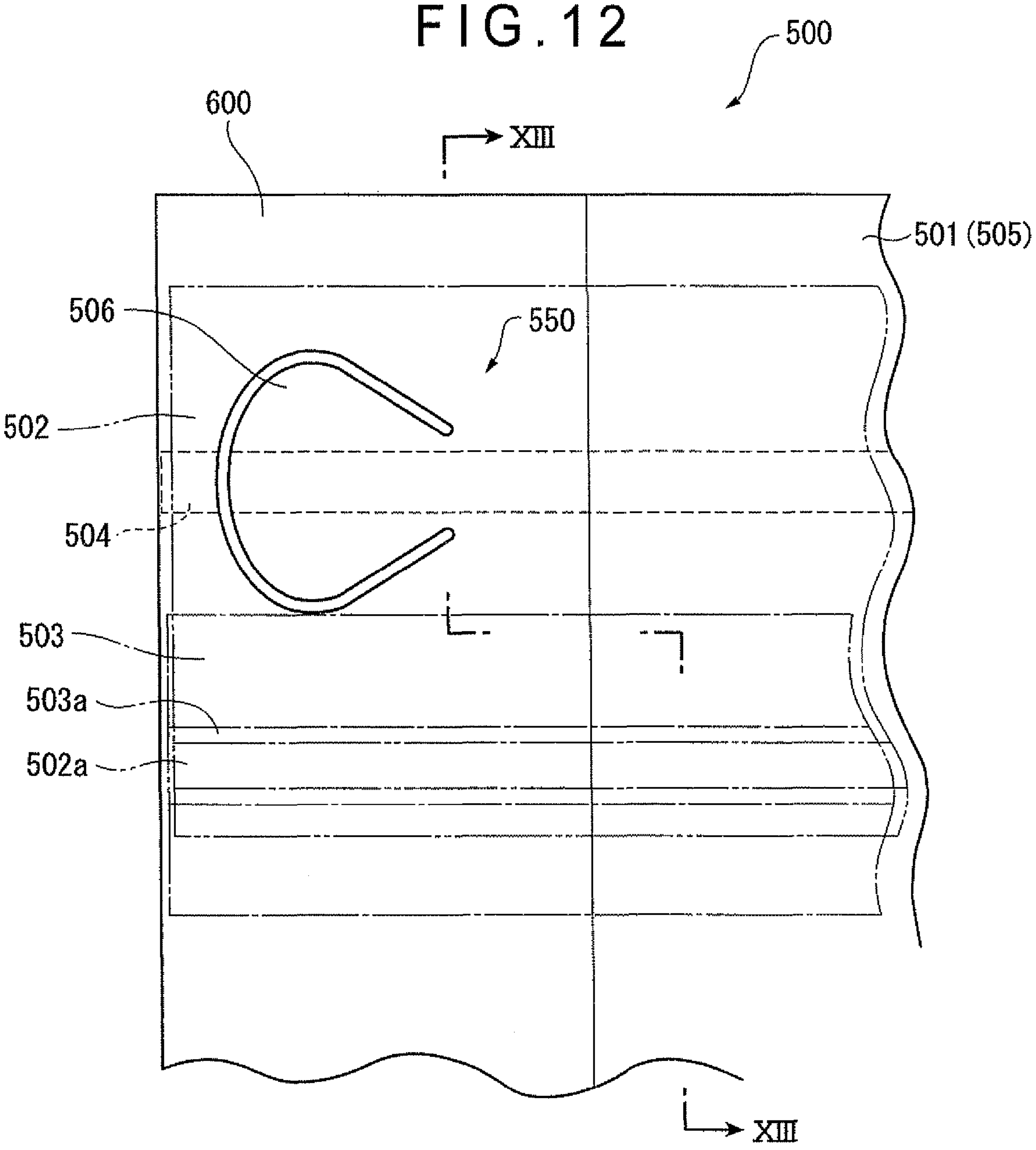
FIG. 12 is a front view showing a reclosable-tape-having bag in the vicinity of an opening trigger according to a related art.
Figure 13:
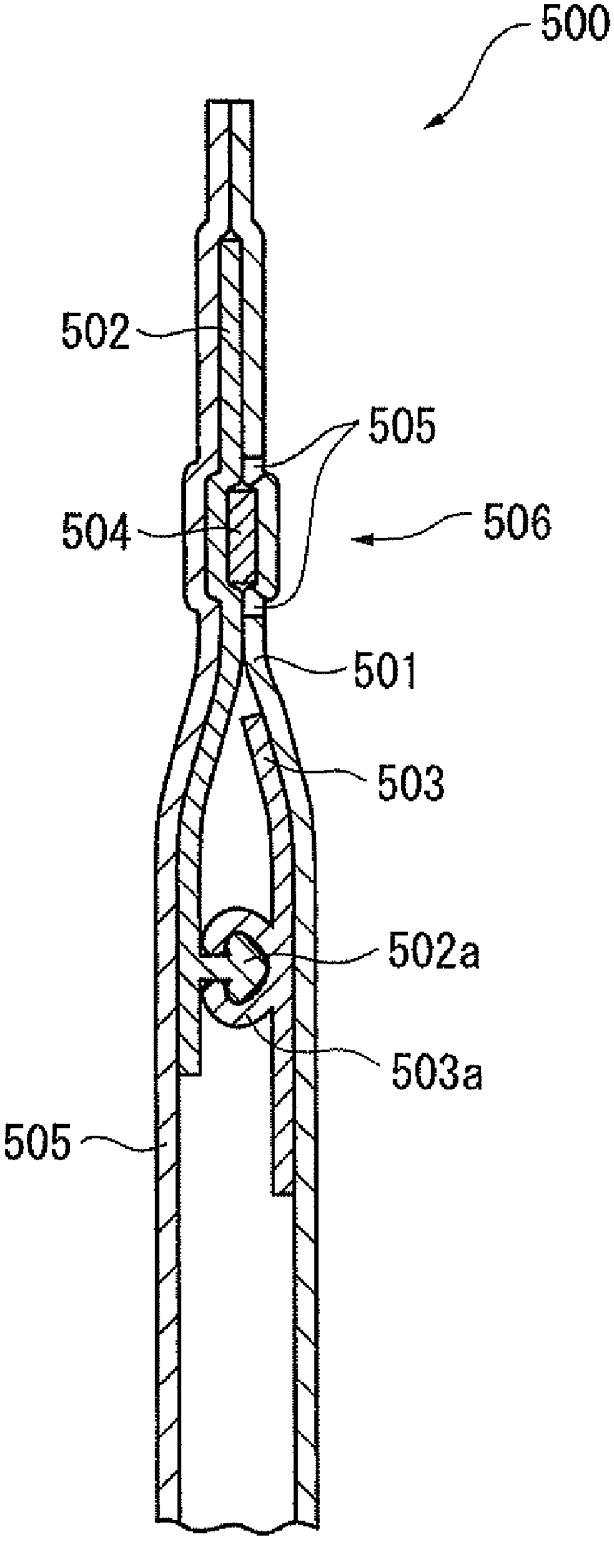
FIG. 13 is a cross-sectional view taken along XIII-XIII line in FIG. 12.

As shown in FIG. 11, an incision is shaped such that a whole-incised portion 410 and a half-incised portion 411 are included therein, and the incision preferably includes half-incision extensions 412 vertically extended from the half-incised portion 411 in addition to the half-incised portion 411.

It does not matter whether or not the whole-incised portion 410 formed by the whole-notching instrument 1100A is continuously connected with the half-incised portion 411 and the half-incision extension 412 formed by the half-notching instrument 1100B.

The shape of the incision formed by the half-notching instrument 1110B is not limited to the shape shown in FIG. 11 as long as the half-notching portion can more widely receive an incision direction from the whole-notching portion 410.

For example, the half-notching blade 1110B forming the half-incised portion 411 may be made larger than the terminal-to-terminal distance of the whole-notching blade 1110A forming the whole-incised portion 410 such that the incision from the whole-incised portion 410 can be received only by the half-notching portion 411. As a matter of course, in such a structure, it does not matter whether or not the whole-incised portion 410 is continuously connected to the half-incised portion 411 as described above.

The step provided on the anvil 1110 differentiates the whole-notching blade 1110A from the half-notching blade 1110B as shown in FIG. 10B. No step is provided to the Thomson blade 1110 itself. The gap between the half-notching blade 1110B and the concave portion 1120B of the anvil 1120 is substantially equal to the thickness of the upper film 11 and the open tape 23.

As a matter of course, the Thomson blade 1110 may be conversely provided with the step while the anvil 1120 may be made flat, or these methods may be used together.

With this arrangement, when a tab 400 formed by the whole-notching instrument 1100A is pinched to open the bag, the incision from the whole-incised portion 410 forming the tab 400 is reliably conveyed to the half-incised portion 411 or the half-incision extension 412 formed by the half-notching instrument 1100B. Since the half-notching portion can more widely receive an incision direction from the whole-notching portion 410, the bag body 10 can be reliably ripped and opened using the open tape.

INDUSTRIAL APPLICABILITY

The manufacturing method for the reclosable-tape-having bag according to the present invention is widely applicable to various bag such as a gusset bag and a pillow bag irrespective of a bag shape as a method for manufacturing a packaging material that seal-packages various articles such as foods, pharmaceutical and medical products, electronic parts and stationeries.

What is claimed is:

1. A manufacturing device that manufactures a reclosable-tape-having bag, the reclosable-tape-having bag including a first base material and a second base material, the first base material and the second base material being superposed together so that a periphery of the base materials are joined to form a bag body, a reclosable tape having a male fastener and a female fastener that are engageable with each other, the reclosable tape being mounted on an inner surface of the first base material of the bag body, an open tape being adapted to rip and open the bag body and provided between a mounting base of either the male fastener or the female fastener and the first base material of the bag body, the manufacturing device comprising:

a notching instrument that notches the bag body, wherein the notching instrument includes: a whole-notching instrument that punches the first base material, the second base material, the open tape and the mounting base to form a tab on an opening trigger provided on a side seal of the bag body; and a half-notching instrument that forms an incision on the second base material and a portion of the mounting base corresponding to a position of the open tape, and the whole-notching instrument and the half-notching instrument are adjacently provided such that the tab formed by the whole-notching instrument is substantially continuously connected with the incision formed by the half-notching instrument.

2. The manufacturing device for the reclosable-tape-having bag according to claim 1, wherein the notching instrument including the whole-notching instrument and the half-notching instrument includes a notching blade that punches the bag body or forms the incision and an anvil that receives the notching blade.

3. The manufacturing device for the reclosable-tape-having bag according to claim 2, wherein the notching blade is integrally formed by a whole-notching blade that forms the whole-notching instrument and a half-notching blade that forms the half-notching instrument.

4. The manufacturing device for the reclosable-tape-having bag according to claim 3, wherein the notching blade provides the whole-notching blade that punches the bag body and the half-notching blade that forms the incision on the bag body by providing a step to the anvil.

5. The manufacturing device for the reclosable-tape-having bag according to claim 3, wherein the whole-notching blade that punches the bag body and the half-notching blade that forms the incision on the bag body are provided by providing a step to the notching blade.

6. The manufacturing device for the reclosable-tape-having bag according to claim 2, wherein a protection film that protects the notching blade is provided between the anvil and the notching blade.

7. The manufacturing device for the reclosable-tape-having bag according to claim 3, wherein an end-to-end distance of the half-notching blade is wider than a terminal-to-terminal distance of the whole-notching blade.

8. A manufacturing method for manufacturing a reclosable-tape-having bag, the reclosable-tape-having bag including a first base material and a second base material, the first base material and the second base material being superposed together so that a periphery of the base materials are joined to form a bag body, a reclosable tape having a male fastener and a female fastener that are engageable with each other, the reclosable tape being mounted on an inner surface of the first base material of the bag body, the manufacturing method comprising steps of:

providing an open tape between a mounting base of either the male fastener or the female fastener and the first material of the bag body, the open tape being adapted to rip and open the bag body;

punching the first base material, the second base material, the open tape and the mounting base to form a tab on an opening trigger provided on a side seal of the bag body by a whole-notching instrument;

forming an incision on the second base material and a portion of the mounting base corresponding to a position of the open tape by a half-notching instrument; and substantially continuously connecting the tab formed by the whole-notching instrument with the incision formed by the half-notching instrument.

* * * * *